(12) United States Patent
Shotey

(10) Patent No.: US 8,350,154 B1
(45) Date of Patent: Jan. 8, 2013

(54) UNIVERSAL WALL PLATE MOUNT

(75) Inventor: Michael J. Shotey, Las Vegas, NV (US)

(73) Assignee: Hubbell Incorporated, Shelton, CT (US)

( * ) Notice: Subject to any disclaimer, the term of this patent is extended or adjusted under 35 U.S.C. 154(b) by 217 days.

(21) Appl. No.: 12/882,074

(22) Filed: Sep. 14, 2010

Related U.S. Application Data

(63) Continuation-in-part of application No. 12/724,338, filed on Mar. 15, 2010, which is a continuation-in-part of application No. 11/466,756, filed on Aug. 23, 2006, now Pat. No. 7,683,257.

(60) Provisional application No. 61/242,293, filed on Sep. 14, 2009, provisional application No. 60/710,979, filed on Aug. 23, 2005, provisional application No. 60/803,973, filed on Jun. 5, 2006, provisional application No. 61/160,118, filed on Mar. 13, 2009.

(51) Int. Cl.
*H02G 3/14* (2006.01)

(52) U.S. Cl. .............. 174/66; 174/67; 174/57; 220/241; 220/242; 439/536

(58) Field of Classification Search .................... 174/66, 174/67, 53, 57, 58, 480, 481, 50; 220/3.2–3.8, 220/241, 242; 439/535, 536, 537, 557, 532; D8/353; D13/177; 361/760
See application file for complete search history.

(56) References Cited

U.S. PATENT DOCUMENTS

| | | | |
|---|---|---|---|
| 1,952,719 A | 3/1934 | Lewin | |
| 3,437,737 A | 4/1969 | Wagner | |
| 3,437,738 A | 4/1969 | Wagner | |
| 3,571,548 A | 3/1971 | Osika | |
| 3,953,933 A | 5/1976 | Goldstein | |
| 4,017,137 A | 4/1977 | Parks | |
| 4,228,317 A | 10/1980 | Cziment | |
| 4,998,635 A | 3/1991 | Vink et al. | |
| 5,178,350 A | 1/1993 | Vink et al. | |
| 5,356,311 A * | 10/1994 | Liu | 439/536 |
| 5,744,750 A | 4/1998 | Almond | |
| 5,898,130 A | 4/1999 | Tansi et al. | |
| 5,961,345 A | 10/1999 | Finn et al. | |
| 5,965,846 A | 10/1999 | Shotey et al. | |
| 6,132,242 A * | 10/2000 | Hall et al. | 439/532 |
| 6,234,836 B1 * | 5/2001 | Schmidt et al. | 439/557 |
| 6,266,250 B1 * | 7/2001 | Foye | 361/760 |

(Continued)

FOREIGN PATENT DOCUMENTS

EP    0744805 B1    11/1996

OTHER PUBLICATIONS

Author: Cooper Wiring Devices; Title of Article: New G-Tool to Assure Alignment of Multi-Gang Installations; Title of the Item: press release from website; pp. 2.

(Continued)

*Primary Examiner* — Angel R Estrada
(74) *Attorney, Agent, or Firm* — Booth Udall, PLC

(57) ABSTRACT

A wall plate comprising a housing defining a wall plate perimeter, a pair of mounting members integral to the housing, at least one mounting flange having an aperture and being removably secured to the pair of mounting members, and a mounting screw for securing an electrical device to the at least one mounting flange.

20 Claims, 4 Drawing Sheets

U.S. PATENT DOCUMENTS

| | | |
|---|---|---|
| 6,281,438 B1 | 8/2001 | Desilets et al. |
| 6,384,354 B1 | 5/2002 | Shotey et al. |
| 6,422,898 B1 * | 7/2002 | Harvey et al. ................ 439/536 |
| 6,441,304 B1 * | 8/2002 | Currier et al. .................. 174/53 |
| 6,570,091 B1 | 5/2003 | Kesler et al. |
| 6,616,005 B1 | 9/2003 | Pereira et al. |
| 6,642,453 B2 | 11/2003 | Shotey et al. |
| 6,901,779 B2 | 6/2005 | Magee et al. |
| 6,977,342 B1 | 12/2005 | Shotey et al. |
| 6,989,992 B1 * | 1/2006 | Wang .......................... 439/532 |
| 7,067,737 B2 | 6/2006 | Mallen |
| 7,122,740 B2 | 10/2006 | Xu et al. |
| 7,683,257 B1 * | 3/2010 | Shotey et al. ................... 174/66 |
| 7,763,798 B1 * | 7/2010 | Shotey et al. ................... 174/66 |
| 8,101,860 B1 * | 1/2012 | Shotey et al. ................... 174/66 |

OTHER PUBLICATIONS

Author: No More Screws.Com; Title of Article: Installing the Cheetah Speed System; Title of the Item: webpage; pp. 1.

* cited by examiner

UNIVERSAL WALL PLATE MOUNT

CROSS REFERENCE TO RELATED APPLICATIONS

This present application claims the benefit of the filing date of U.S. Provisional Patent Application 61/242,293 entitled "Universal Wall Plate Mount" to Marcus Shotey which was filed on Sep. 14, 2009, the contents of which are hereby incorporated herein by reference. This application is also a continuation-in-part of application Ser. No. 12/724,338, entitled "Electrical Cover Plate" to Shotey et al. filed on filed Mar. 3, 2010, which is a continuation-in-part of application Ser. No. 11/466,756, now U.S. Pat. No. 7,683,257, filed Aug. 23, 2006, and issued on Mar. 23, 2010, which claims the benefit of the filing date of U.S. Provisional Patent Application 60/710,979, which was filed on Aug. 23, 2005 and U.S. Provisional Patent Application 60/803,973, which was filed on Jun. 5, 2006. Application Ser. No. 12/724,338 also claims the benefit of the filing date of U.S. Provisional Patent Application 61/160,118, which was filed on Mar. 13, 2009. The disclosures of each of these related applications are hereby incorporated herein by reference.

BACKGROUND

1. Technical Field

Aspects of this document relate generally to wall plates for electrical devices and electrical boxes.

2. Background Art

Electrical wall plates are conventionally used to cover electrical devices and electrical boxes to prevent electrical shock while providing an aesthetically pleasing appearance. Further, electrical wall plates are typically installed after the electrical devices are mounted within the electrical box.

SUMMARY

Aspects of this document relate to electrical wall plates. In one aspect, a wall plate may include a housing defining a wall plate perimeter and an aperture therethrough, a pair of mounting members integral to the housing on opposing sides of the aperture, and at least one mounting flange having a mounting screw aperture therethrough, the at least one mounting flange being removably secured to the pair of mounting members and positioned between the pair of mounting members.

Particular implementations may comprise one or more of the following features. The wall plate mounting members may each further include at least five predetermined mounting positions. The mounting flange may be compression fit between the pair of mounting members. Each of the mounting members may include a plurality of pins, with each pin located at a predetermined mounting position. The mounting flange may include a pair of holes, with each of the holes adapted to receive one of the plurality of pins.

The mounting member may further include a first wall and a second wall arranged perpendicular to each other, with the first wall spacing the second wall from the housing and the second wall removably secures the at least one mounting flange. An opening within the wall plate perimeter may include a first width and the mounting flange may include a central portion having a second width different from the first width. The second width may be greater than the first width. The central portion of the mounting flange may be compressible to be secured within the first width by friction.

The mounting flanges may be secured to a rear portion of the mounting members. A divider may be included and defines at least a portion of two gangs. The at least one mounting flange may be at least partially secured to the divider. In another aspect, a method of mounting an electrical device includes the steps of providing a wall plate having a housing and a pair of mounting members integral to the housing, securing a mounting flange, having a mounting aperture therethrough, to the pair of mounting members by spanning the mounting flange between the pair of mounting members, securing the mounting flange to the electrical device, and mounting the wall plate to an electrical device through the mounting aperture.

In particular implementations, the step of mounting the wall plate includes the step of mounting the wall plate to the electrical box through a plurality of apertures in the electrical device. The step of securing the mounting flange to the pair of mounting members includes the step of compressing the mounting flange and frictionally engaging the mounting flange with the mounting members. The step of securing the mounting flange to the pair of mounting members includes the step of locating the mounting flange on a pin located on each of the pair of mounting members.

In another aspect, a method of installing a wall plate includes the steps of first, mounting an electrical device to a wall plate, and second, securing the electrical device to an electrical box after the electrical device is mounted to the wall plate. In a particular implementation, the step of mounting includes mounting the electrical device to a mounting flanged secured to the wall plate.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation and assembly procedures for an electrical wall plate will become apparent for use with implementations of an electrical wall plate from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical wall plate.

Figure 1:
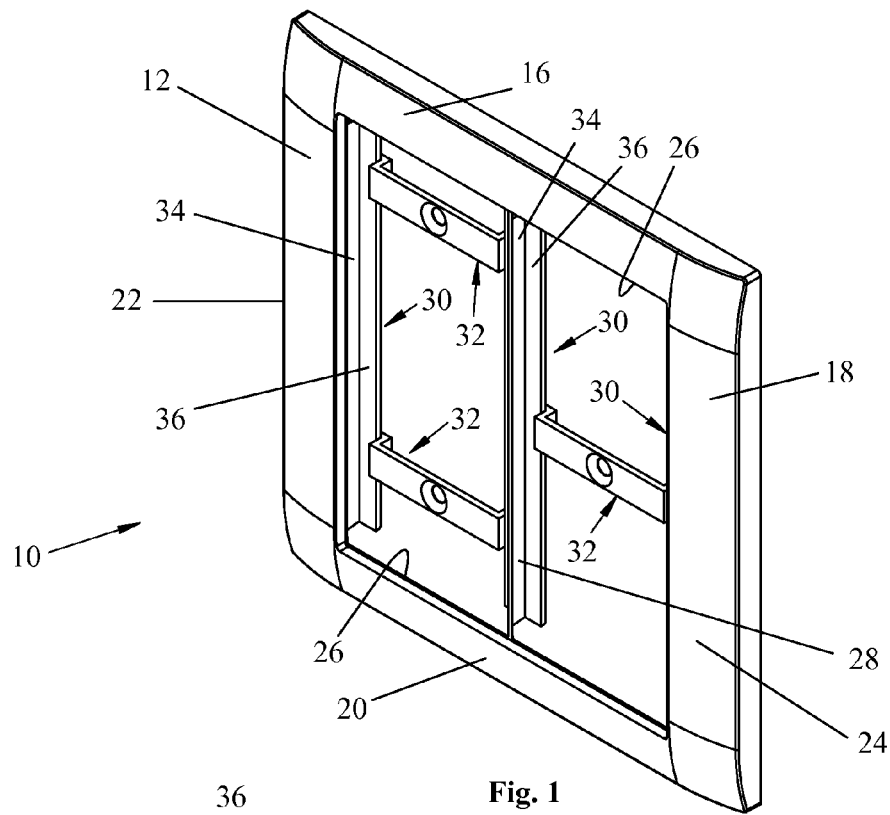
FIG. 1 is an isometric view of an electrical wall plate.
Figure 2:
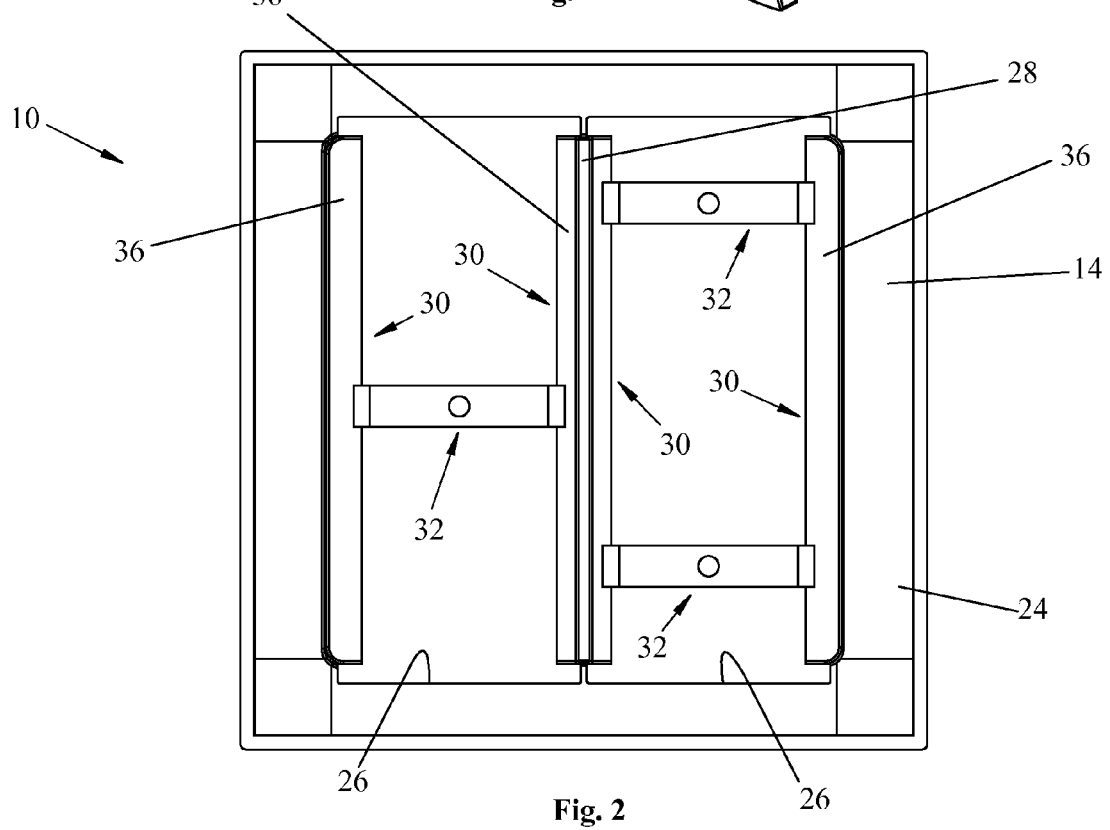
FIG. 2 is a rear view an electrical wall plate.

FIGS. 1 and 2 illustrate an electrical wall plate 10 with a front surface 12, a rear surface 14, a top side 16, a right side 18, a bottom side 20, and a left side 22. The top side, right side, bottom side, and left side together define a perimeter 24 at least partially defining an opening 26. Further, a divider 28 may be disposed within opening 26 to increase the number of gang openings within the wall plate.

Wall plate 10 also includes mounting members 30 arranged to receive mounting flanges 32. Mounting members 30 preferably extend for the entire height of opening 26 and include a first wall 34 arranged perpendicular to a second wall 36. In this arrangement, first wall 34 spaces mounting flange 32 from front surface 12, while second wall 36 may be used to secure the mounting flange.

As particularly seen in FIGS. 1 and 2, mounting flanges 32 are disposed within opening 26 and are preferably secured between mounting member 30. In one example, divider 28 is used to provide two mounting locations and divider 28 includes mounting members 30 with both first and second walls 34 and 36 respectively. Thus, mounting flanges can be secured within opening 26 between divider 28 and either right side 18 or left side 22.

Figure 3:
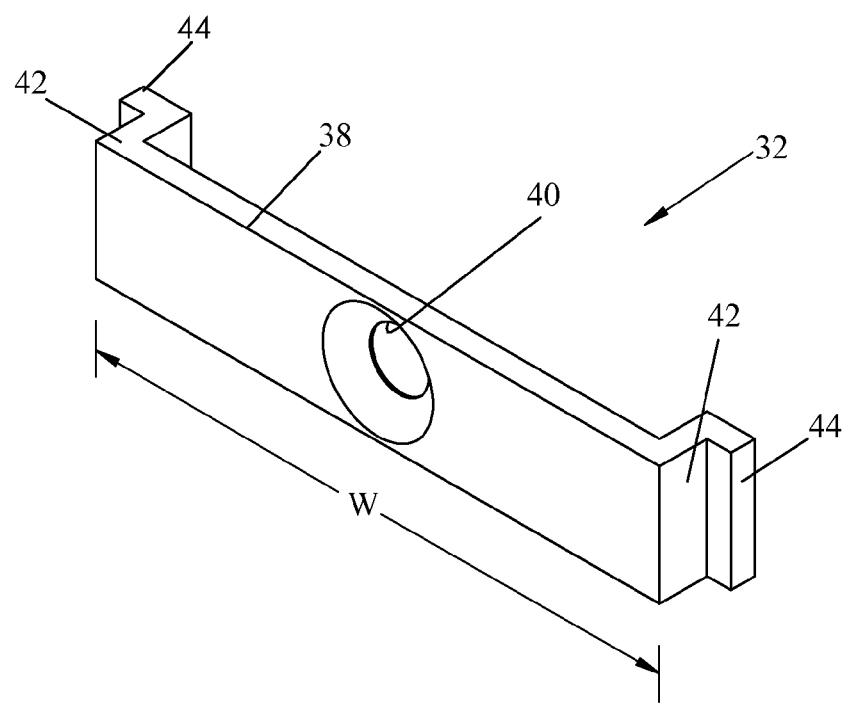
FIG. 3 is an isometric view of an electrical wall plate mounting flange.

FIG. 3 illustrates mounting flange 32 with a central portion 38 having an aperture 40. Aperture 40 may be countersunk to provide a clean and flush appearance. Central portion 38 may have a width W that is larger than the distance between adjacent second walls 36 in one implementation so that central portion 38 may be partially compressed to securely fit between the second walls. In this arrangement, mounting flange 32 is frictionally secured between second walls 36.

Mounting flange 32 may also include a primary wall 42 and a secondary wall 44. Primary wall 42 may locate secondary wall 44 offset from central portion 38. Further, the offset in the mounting flange may be equal to, greater, or smaller than any offset created by first wall 34 in mounting member 30.

Figure 4:
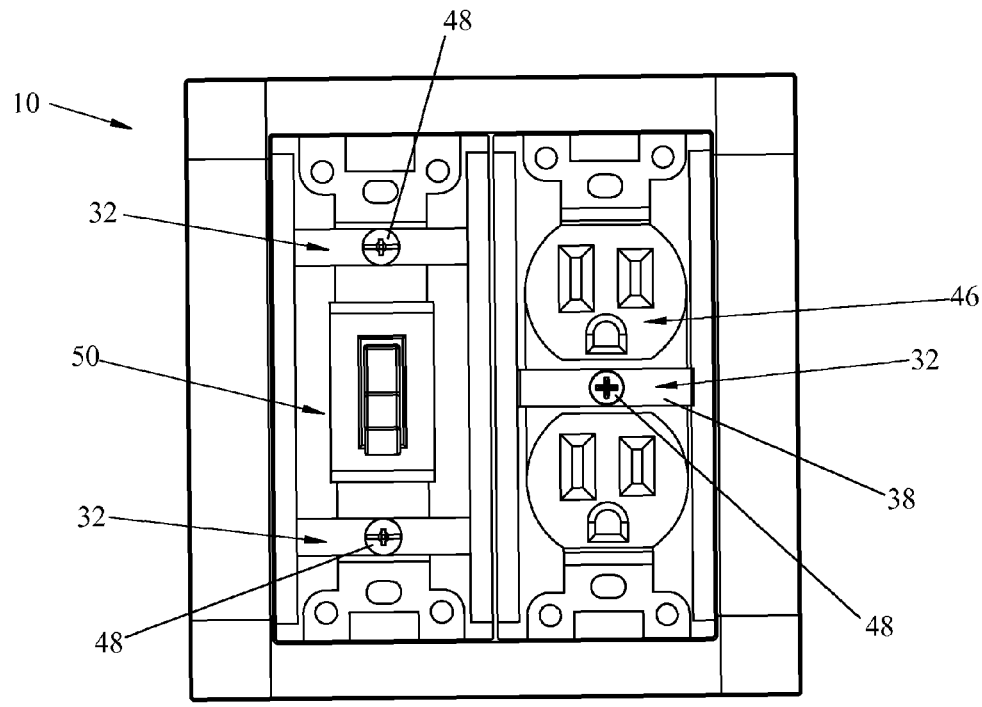
FIG. 4 is a front view of an electrical wall plate with a toggle switch and duplex receptacle installed.
Figure 5:
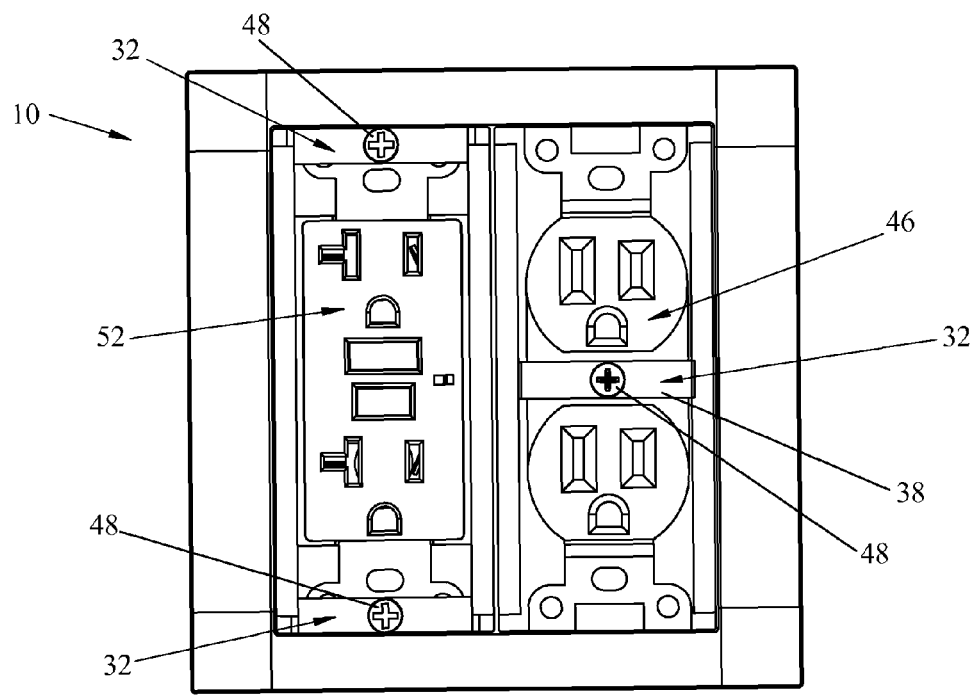
FIG. 5 is a front view of an electrical wall plate with a ground fault circuit interrupter receptacle and a duplex receptacle installed.

FIGS. 4 and 5 illustrate various arrangements of electrical devices installed within wall plate 10. In both FIGS. 4 and 5, a duplex receptacle 46 is located in the right gang and mounted with a screw 48 to central portion 38 of mounting flange 32. Due to the fact that duplex receptacle 46 is mounted to a wall plate with a single, centrally located screw, mounting flange 32 is located in the central portion of opening 26 within the right side gang. In the left gang of FIG. 4, a toggle switch 50 is installed using a pair of mounting flanges 32. Toggle switch 50 is mounted to the wall plate at a position above and below the central portion of the device with screws 48. Thus, mounting flanges 32 are each located at a portion approximately halfway between the middle of opening 26 and the top and bottom of the opening, respectively.

FIG. 5 illustrates a ground fault circuit interrupter (GFCI) receptacle 52 installed within the left gang using screws 48 and mounting flanges 32. Due to the fact that GFCI receptacles are larger than toggle switches and do not have an open central portion like duplex receptacles, mounting flanges 32 are secured near the top and bottom sides, respectively, of opening 26. Thus, it is seen that the same mounting flange can be located at any position within opening 26 to provide a mounting structure for any type of electrical device or receptacle.

In operation, mounting flanges 32 may be installed within opening 26 by compressing the mounting flange and allowing frictional engagement to maintain the mounting flange's position. The mounting flange is preferably located at the correct position for the device or receptacle that will be installed and is placed in the proper position from the rear surface side of wall plate 10. The receptacle or device is located proximate the rear surface side of the wall plate and a screw is inserted through aperture 40 to secure the device or receptacle to the wall plate. The wall plate and receptacle/device assembly can then be secured to an electrical box (not shown) through the mounting tabs in the electrical device and/or receptacle. Accordingly re-alignment of devices is no longer necessary to correct improper device installation.

Figure 6:
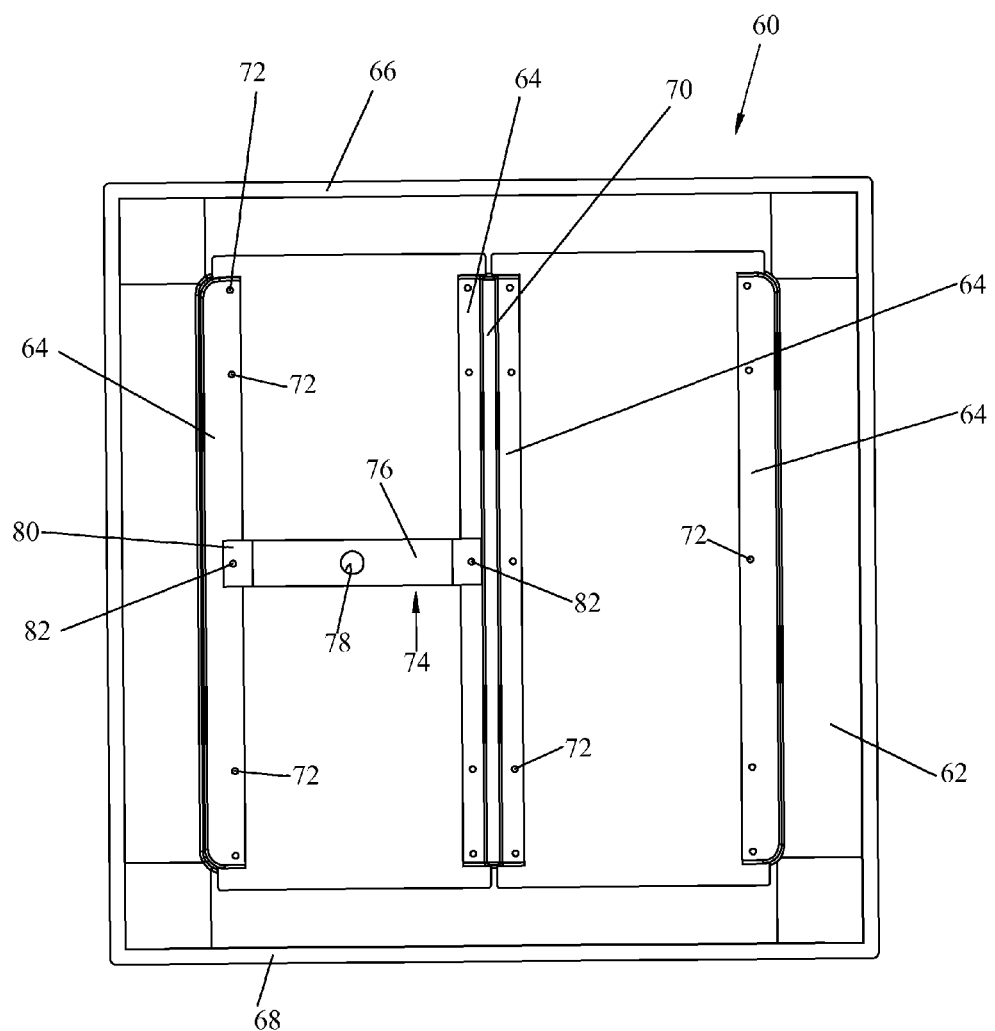
FIG. 6 is rear view of an electrical wall plate with a mounting flange installed on pins.

FIG. 6 illustrates an implementation with a wall plate 60 with a rear surface 62 and mounting members 64 extending from a top side 66 to a bottom side 68. Further, a divider 70 may also include mounting member 64 if a multiple gang wall plate is used. Each mounting member 64 may include a plurality of pins 72. Pins 72 may include a continuous cross-section or a slightly enlarged tip for retaining mounting flanges. Pins 72 may correspond to appropriate mounting arrangements for various devices. While one implementation includes five pins on each mounting member, any suitable pin arrangement may be utilized.

A mounting flange 74 again may include a central portion 76 with an aperture 78 for mounting an electrical device or receptacle. A secondary wall 80 may include a hole 82 for receiving pin 72. Thus, regardless of the required position of mounting flange 74, pins 72 are arranged to receive holes 82 of the mounting flange to guarantee proper alignment of the electrical device and wall plate.

In operation, once the installer determines which devices will be located in which gang, mounting flanges 74 are located on appropriate pins 72. The electrical device/receptacle may be located near rear surface 62 and a screw secures the device to the mounting flange through each aperture 78. The wall plate with electrical devices can then be installed as a single unit.

It will be understood that implementations are not limited to the specific components disclosed herein, as virtually any components consistent with the intended operation of a method and/or system implementation for an electrical wall plate may be utilized. Accordingly, for example, it should be understood that, while the drawing figures accompanying text show and describe a rectangular electrical wall plate, an electrical wall plate of the present invention may contain any number of sides. Components may comprise any shape, size, style, type, model, version, class, grade, measurement, concentration, material, weight, quantity, and/or the like consistent with the intended operation of a method and/or system implementation for an electrical wall plate.

The concepts disclosed herein are not limited to the specific implementations shown herein. For example, it is specifically contemplated that the components included in a particular implementation of an electrical wall plate may be formed of any of many different types of materials or combinations that can readily be formed into shaped objects and that are consistent with the intended operation of an electrical wall plate. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the electrical wall plate may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical wall plate, it should be readily apparent that a number of modifications may be made without departing from the spirit thereof and that these implementations may be applied to other electrical wall plates. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A wall plate comprising:
a housing defining a wall plate perimeter and an aperture therethrough;
a pair of mounting members integral to the housing on opposing sides of the aperture; and
at least one mounting flange removably secured to and positioned between the pair of mounting members, the at least one mounting flange comprising a mounting screw aperture centered between the pair of mounting flanges and sized to allow insertion of a screw therethrough.

2. The wall plate of claim 1 wherein each of the mounting members further comprises at least five predetermined mounting positions.

3. The wall plate of claim 1 wherein the mounting flange is compression fit between the pair of mounting members.

4. The wall plate of claim 3 wherein each of the mounting members further comprises a plurality of pins, wherein each pin is located at a predetermined mounting position.

5. The wall plate of claim 4 wherein the mounting flange further comprises a pair of holes, wherein each of the holes is adapted to receive one of the plurality of pins.

6. The wall plate of claim 1 wherein the mounting member further comprises a first wall and a second wall arranged perpendicular to each other, wherein the first wall spaces the second wall from the housing and the second wall removably secures the at least one mounting flange.

7. The wall plate of claim 1 further comprising an opening within the wall plate perimeter and having a first width wherein the mounting flange further comprises a central portion having a second width different from the first width.

8. The wall plate of claim 7 wherein the second width is greater than the first width.

9. The wall plate of claim 8 wherein the central portion is compressible to be secured within the first width by friction.

10. The wall plate of claim 1 wherein the mounting flanges are secured to a rear portion of the mounting members.

11. The wall plate of claim 1 further comprising a divider, wherein the divider defines at least a portion of two gangs.

12. The wall plate of claim 11 wherein the at least one mounting flange is at least partially secured to the divider.

13. A method of mounting a wall plate to an electrical device, the method comprising:
removably securing a mounting flange to a pair of mounting members on opposing sides of an aperture extending through the wall plate by spanning the mounting flange between the pair of mounting members and abutting opposing secondary walls of the mounting flange against rear surfaces of the pair of mounting member such that primary walls of the mounting flange extend through the aperture;
positioning a rear surface of the wall plate over an electrical device mounted in an electrical box in a wall; and
securing the mounting flange to the electrical device by inserting a screw into the electrical device through a mounting aperture centered on the mounting flange between the mounting members.

14. The method of claim 13 wherein removably securing the mounting flange comprises removably securing a plurality of mounting flanges and securing the mounting flange to the electrical device comprises securing the plurality of mounting flanges to the electrical device by inserting a different screw through a mounting aperture on each of the plurality of mounting flanges and into the electrical device.

15. The method of claim 13 wherein securing the mounting flange to the pair of mounting members comprises compressing the mounting flange and frictionally engaging the mounting flange with the mounting members.

16. The method of claim 13 wherein the securing the mounting flange to the pair of mounting members comprises locating the mounting flange on a pin located on each of the pair of mounting members.

17. A electrical device mounting system, comprising:
a wall plate comprising four sides, a front surface, a rear surface and at least one opening extending therethrough;
at least two mounting members, each mounting member positioned on opposing sides of the at least one opening and comprising a first member wall extending substantially perpendicularly away from the rear surface of the wall plate and a second member wall substantially perpendicular to the first member wall;
at least one mounting flange removably secured to the wall plate between the two mounting members, the at least one mounting flange comprising:
two secondary walls on opposing ends of the mounting flange that abut the second member wall when the at least one mounting flange is removably secured to the wall plate;

a primary wall perpendicular to the secondary wall that extends through the at least one opening when the at least one mounting flange is removably secured to the wall plate; and a mounting screw aperture positioned on the mounting flange to allow insertion of a screw therethrough to couple the wall plate to the electrical device.

18. The electrical device mounting system of claim 17, wherein:

the at least one opening comprises a first opening and a second opening;

the at least two mounting members comprise three mounting members comprising a first mounting member that divides the first opening and the second opening, a second mounting member positioned on a side of the first opening opposite the first mounting member, and a third mounting member position on a side of the second opening opposite the first mounting member; and the at least one mounting flange comprises a first mounting flange removably secured to the wall plate between the first and the second mounting members, and a second mounting flange removably secured to the wall plate between the first and the third mounting members, each of the first and the second mounting flange comprising the secondary walls, two primary walls, and a mounting screw aperture.

19. The electrical device mounting system of claim 18, further comprising a third mounting flange removably secured to the wall plate between the first and the second mounting members, the third mounting flange comprising:

two secondary walls on opposing ends of the mounting flange that abut the second member wall;

a primary wall perpendicular to each secondary wall that extends through the at least one opening; and a mounting screw aperture positioned on the mounting flange to allow insertion of a screw therethrough to couple the wall plate to the electrical device.

20. The electrical device mounting system of claim 19, wherein the first, second, and third mounting flange are removably secured to the wall plate by compression fit and frictional engagement between the first, second, and third mounting flanges and the respective first, second, and third mounting members.

* * * * *